Dec. 14, 1926.  
F. A. BRANDECKER  
1,610,546  
ELECTRICAL TRANSMITTING DEVICE  
Filed March 15, 1923
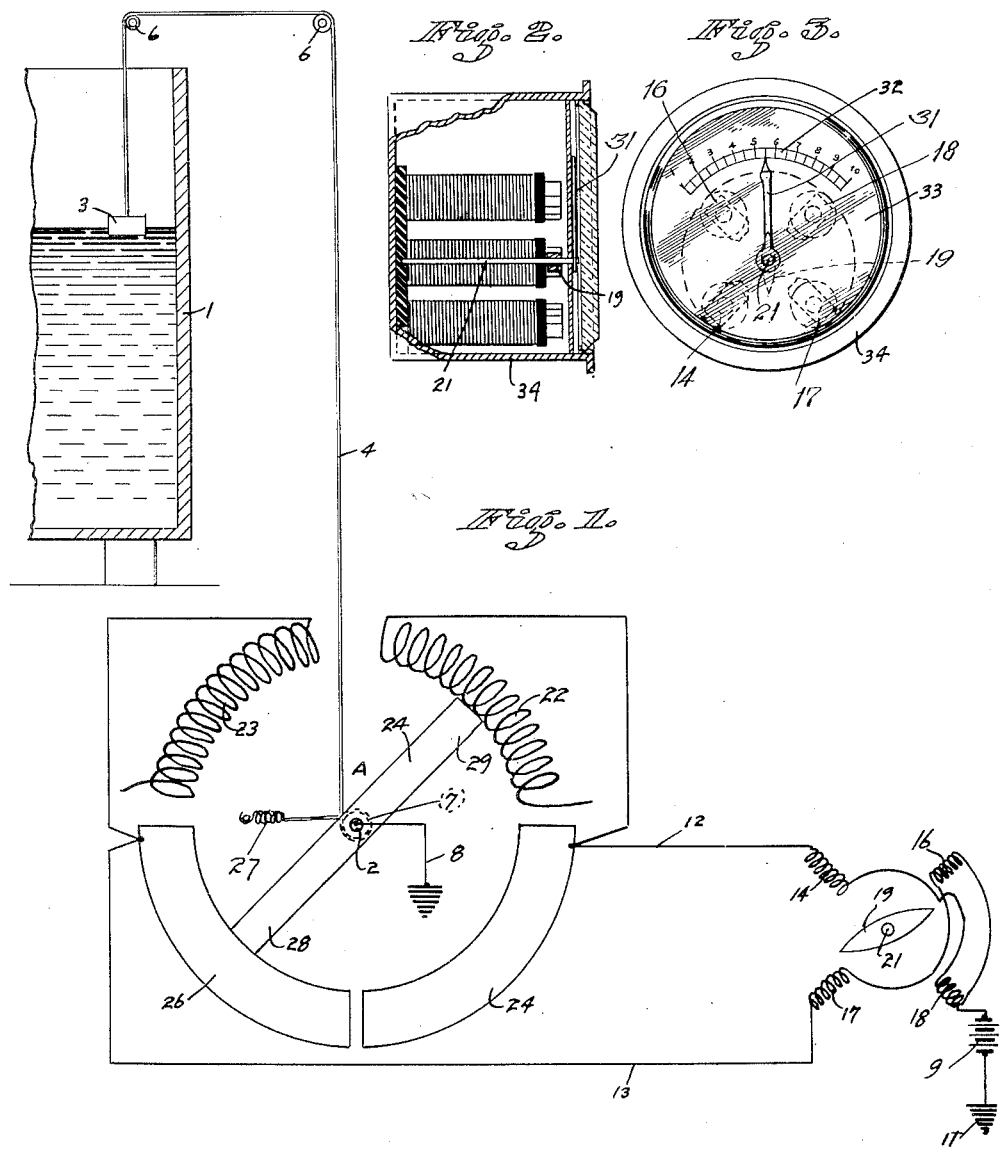
INVENTOR.  
F. A. BRANDECKER  
BY  
ATTORNEYS.

Patented Dec. 14, 1926.

1,610,546

UNITED STATES PATENT OFFICE.

FRANK A. BRANDECKER, OF VALLEJO, CALIFORNIA.

ELECTRICAL TRANSMITTING DEVICE.

Application filed March 15, 1923. Serial No. 625,426.

The present invention relates to improvements in electrical transmission devices and has particular reference to a device adapted to transmit the reading of an indicating device to a second indicating device disposed at a distance therefrom. A device of this character may be used for many different purposes. One of the purposes for which it was designed is to allow the readings of a liquid level indicator to be transmitted to an indicating device disposed at a distant point which would enable, for instance, an operator to ascertain the level of water in a tank from the readings of an instrument disposed in his room or in any other place where his presence may be required for the performance of his other duties. Another instance in which my device might be used would be to indicate to the captain of a ship standing on the bridge the exact position of the rudder of the ship. Various other uses will be readily found and it is not intended to confine the present invention to any particular use.

The preferred form of the invention is illustrated in the accompanying drawing in which Figure 1 shows a general diagrammatic view of my transmitting device as used in connection with a liquid level indicator, Figure 2 a vertical cross section through an indicating device adapted to be used in connection with my invention and Figure 3 a front view of the same. While I have shown only the preferred form of the invention it should be understood that various changes or modifications may be made within the scope of the claims hereto attached without departing from the spirit of the invention.

In the form shown in the drawing my transmitting device is used to indicate the water level in the tank (1). A shaft (2) is actuated by means of the rising and falling of the water level through a float (3) operatively connected with the shaft thru a cord (4) passing over to pulleys (6) and wound on to drum (7) associated with the shaft. The latter shaft which is made of conducting material is grounded as shown at (8) and forms part of a divided electrical circuit including a source of electrical energy (9) and grounded at the other end as shown at (11). The two branches (12) and (13) of the circuit have electro-magnets (14), (16), (17) and (18) incorporated therein with the electro-magnets arranged in such a manner that those of one branch affect an armature (19) in an opposite sense to those of the other branch. The armature (19) is pivotally mounted on a shaft (21) and the four electro-magnets are grouped around the armature in such a manner that the two electro-magnets of each branch are disposed diametrically opposite one another and present to the armature fields of opposite polarity. If for instance the electro-magnet (16) presents a north pole to the armature the electro-magnet (17) presents a south pole so that the current flowing through this branch and energizing these two electro-magnets would have a tendency to swing the armature into alinement with the two electro-magnets. At the same time the two electro-magnets (14) and (18) of the other branch have a tendency to force the armature into alinement with the latter two electro-magnets, the electro-magnet (18) presenting a north pole to the armature and the electro-magnet (14) a south pole. It will appear from this arrangement that if a current is evenly distributed through the two branches the armature will assume the position indicated in Figure 1, the two north poles and the two south poles attracting the same with equal force. If however the current is distributed unevenly the electro-magnets of the branch containing the larger amount of current will exercise a stronger attraction on the armature and force the latter to assume a position in accordance with the relative force brought to bear by the electro-magnets of the two branches.

Distribution of the current in accordance with the rise and fall of the water level is brought about by means of two variable resistances (22) and (23) connected into the two branches (12) and (13). These two resistances are adapted to be slidably engaged by the bar (24) fixed to the shaft (2) which is made of conducting material. The two resistances are preferably arranged so that each occupies a quarter section of a circle, the two other quarters being taken up by conducting sectors (24) offering practically no resistance. The variable resistances (22) and (23) are made so that their resistance increases in proportion to the tangent of the angle (A) formed between the bar (24) and the vertical line; that is it increases from practically zero to a value where it becomes an insulator.

It will be seen that when the bar (24) is in the position shown the larger amount of current will pass through the sector (26) and the branch (13) forcing the armature (19) into a slanting position approaching a diagonal line passing through the two electromagnets (16) and (17). If the bar (24) is rotated further in a clockwise direction by the fall of the water level in the tank more resistance will be introduced into the branch (12) until practically all the current passes through the branch (13) forcing the armature (19) into alinement with the two electro-magnets (16) and (17). If the water level rises the bar (24) rotates counter-clockwise due to the action of a spring (27) or any other suitable means and when it reaches a vertical position its lower arm (28) will make contact with both of the sectors (24) and (26) causing an even distribution of the current allowing the armature to assume a neutral position indicated in Figure 1. A further advance of the bar (24) in a counter-clockwise direction will bring the arm (28) in contact with the sector (24) while the other arm (29) engages the resistance (23) introducing resistance into the branch (13) and causing a heavier flow of current in the branch (12) whereby the armature (19) is swung in the opposite direction.

It will thus be seen that the rise or fall of the water level in the tank (1) will cause the armature (19) to assume a definite position corresponding to the level of the water and the exact level may be ascertained by means of an indicating finger (31) fixed to the armature shaft (21), the extreme end of which moves over a scale (32) on the dial (33). The electro-magnets of the indicating device may be arranged in a cylindrical casing (34) illustrated in Figures 2 and 3.

I claim:

1. In combination, a pivotally mounted conducting bar and electrical means for transmitting its motion to a pivotally mounted armature comprising a divided circuit having an electro-magnet in each branch disposed so as to affect the armature in opposite senses, and two adjacent solid conducting ring elements and two adjacent coiled ring resistance elements arranged peripherally around the conducting bar for contacting engagement therewith, the confronting ends of the coiled elements being connected to the solid elements respectively and the latter being connected into the two branches of the divided circuit.

2. In combination, a pivotally mounted conducting bar and electrical means for transmitting its motion to a pivotally mounted armature comprising a divided circuit having an electro-magnet in each branch disposed so as to affect the armature in opposite senses, two ring elements of practically no resistance contacted by one end of the conducting bar when the latter is in a midway position and connected in the two branches of the divided circuit and two resistances connected to the ring elements respectively and remaining out of contact with the conducting bar while the latter is in a midway position, the resistances being arranged so that one of them is contacted by the other end of the conducting bar when the bar is moved to engage one of the ring elements only.

3. In combination, a pivotally mounted conducting bar and electrical means for transmitting its motion to a pivotally mounted armature comprising a divided circuit having an electro-magnet in each branch disposed so as to affect the armature in opposite senses, means for directly connecting the bar into both branches of the divided circuit when the bar occupies a midway position and means for connecting the bar into either one of the branches through a growing resistance while maintaining the direct connection to the other branch when the bar is moved on its pivot.

FRANK A. BRANDECKER.